UNITED STATES PATENT OFFICE.

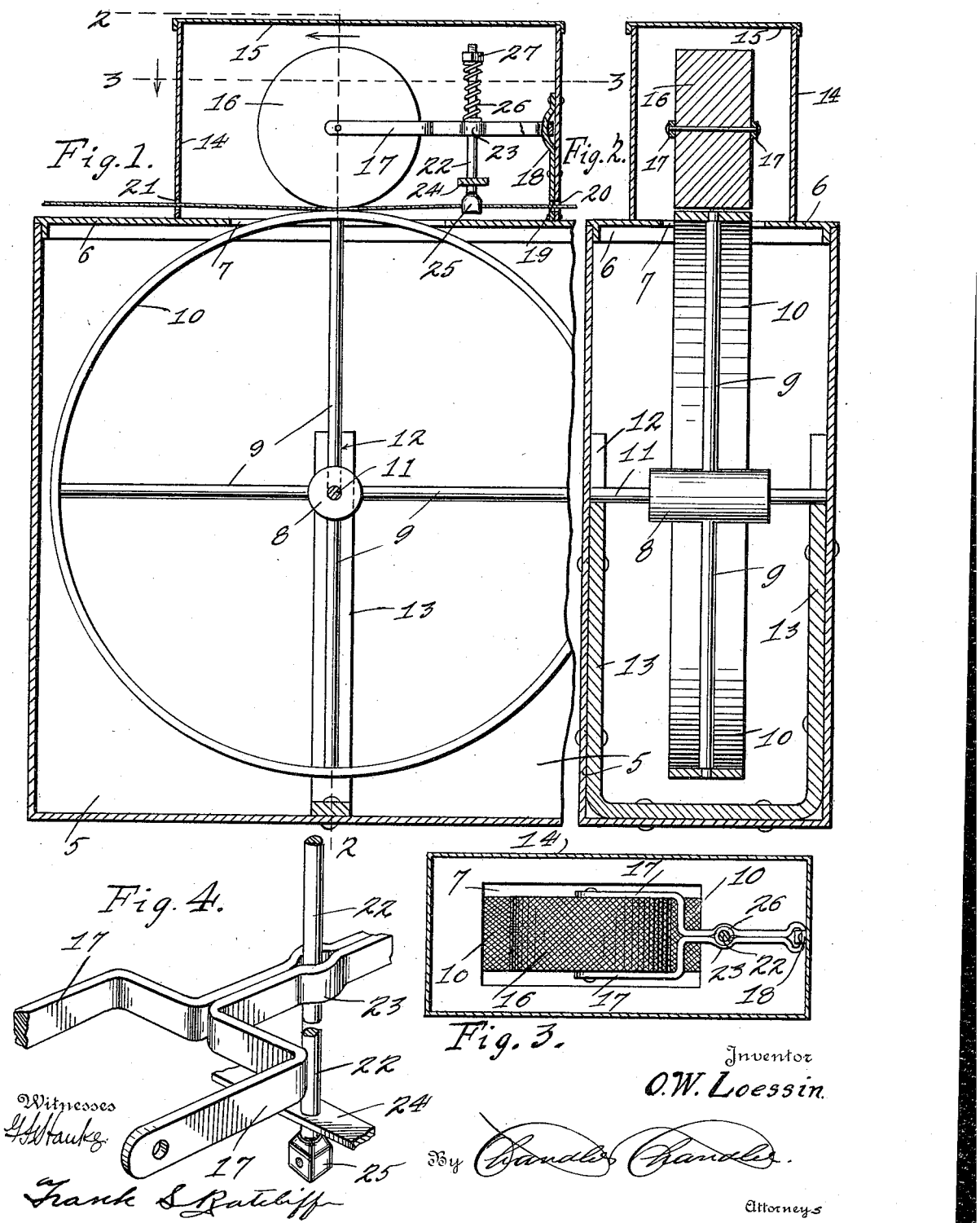

OTTO W. LOESSIN, OF ROBERTS COUNTY, SOUTH DAKOTA.

TWINE-TREATING ATTACHMENT FOR BINDERS.

1,179,639.  Specification of Letters Patent.  Patented Apr. 18, 1916.

Application filed May 5, 1915. Serial No. 26,133.

*To all whom it may concern:*

Be it known that I, OTTO W. LOESSIN, a citizen of the United States, residing in the county of Roberts, State of South Dakota, have invented certain new and useful Improvements in Twine-Treating Attachments for Binders; and I do hereby declare the following to be a full, clear, and exact description of the invention, such as will enable others skilled in the art to which it appertains to make and use the same.

This invention relates to new and useful improvements in apparatus for impregnating twine or like material with a desired liquid and is more particularly directed to the provision of such an apparatus adapted to be associated with binders or like agricultural machines for treating the twine as it is unrolled from the twine can, of the machine.

It is the object of the present invention to provide such means for impregnating twine which may be readily associated with an agricultural machine to efficiently impregnate the twine thereon in such manner that it is protected from crickets or other insects in the field and it is more particularly the object to provide such a device which is automatically adjustable for twine of varying thicknesses.

It is further an object to generally simplify the structure of devices of this character and to improve their efficiency in operation and the ease with which the various parts of the device are accessible.

With the above and other objects and advantages in view, the invention resides more particularly in the novel combination, formation, and arrangement of parts more fully hereinafter described and particularly pointed out in the appended claim.

Reference is had to the accompanying drawing, wherein similar characters of reference designate corresponding parts throughout the several views, and in which:

Figure 1 is a vertical sectional view taken longitudinally through the improved device, Fig. 2 is a vertical sectional view taken transversely through the central portion of the device, Fig. 3 is a sectional view on the line 3—3 of Fig. 1, and Fig. 4 is a detail perspective view of the roller tensioning means.

Referring now more particularly to the accompanying drawing, the preferred form of the device is shown as comprising a tank or receptacle 5 which may be positioned in any desired manner on the receptacle between the twine can and the knotting mechanism, and this receptacle is provided with a detachable cover 6 formed in its central portion with an opening 7, through which projects a portion of the periphery of the main impregnating wheel. This wheel comprises a hub portion 8 from which extends spokes 9 carrying an annular portion 10, this hub 8 being provided with pintles 11 which seat in open slots 12 formed in the arms of a U-shaped supporting bracket 13 secured to the sides and bottom of the can. Thus this bracket, in addition to detachably journaling the wheel serves as a substantial reinforcing means for the can.

Secured on the cover 6 and surrounding the openings 7 thereof is a wall portion 14 which is provided with a detachable cover 15 to form a casing for housing the pressure wheel 16. This wheel is swingingly and journally mounted by means of a yoke member 17 which has its end portion pivotally connected to the wall by means of a strap member 18 embracing the same, this strap member extending downwardly and formed with an eye 19 alining with an opening 20 formed in the can for receiving twine in the casing, this twine passing between the wheels and outwardly at the other end of the casing through a suitable opening 21 formed therein. The peripheries of the wheels are preferably milled or otherwise roughened to facilitate impregnating action on the cord and to further provide a binding relation whereby the wheels are rotated by the cord passing therebetween. To resiliently urge the wheel 16 into engagement, a rod 22 is slidably passed through an eye portion 23 formed on the yoke member and at its lower end engaged through a bracket 24 secured transversely in the casing and enlarged below this bracket to form an apertured head 25 receiving the cord therethrough to form a guide means. A spring 26 surrounds the upper portion of this rod and bears against an adjusting nut 27 thereon and against the said eye portion.

Thus an exceedingly simple device has been provided wherein the parts coact to provide a simple, yet durable and highly efficient structure. The spokes 9 of the main wheel may serve as blades for keeping the impregnating liquid in the receptacle properly agitated, this liquid preferably being a mixture of coal oil and pine tar.

By positioning the casing over the opening in the manner described, any surplus liquid contained on the twine will be removed upon the twine passing through the eye 21 and will flow back into the receptacle.

What is claimed is:

In a device of the class described, the combination with a receptacle of a wheel disposed therein, a casing over the wheel, a member carried pivotally by the casing, a wheel journaled on said member and engaging the first wheel, an eye on said member, a bracket in the casing, a rod passed through the eye and the bracket and provided below said bracket with an apertured head and a spring on the rod engaging said member.

In testimony whereof, I affix my signature, in the presence of two witnesses.

OTTO W. LOESSIN.

Witnesses:
JOHN GUMO,
R. H. GUNDERSON.

Copies of this patent may be obtained for five cents each, by addressing the " Commissioner of Patents, Washington, D. C."